United States Patent [19]

Gullett

[11] Patent Number: 5,185,134

[45] Date of Patent: *Feb. 9, 1993

[54] REDUCTION OF CHLORINATED ORGANICS IN THE INCINERATION OF WASTES

[75] Inventor: Brian K. Gullett, Durham, N.C.

[73] Assignee: The United States of America as represented by the U.S. Environmental Protection Agency, Washington, D.C.

[*] Notice: The portion of the term of this patent subsequent to Jun. 4, 2008 has been disclaimed.

[21] Appl. No.: 672,689

[22] Filed: Mar. 20, 1991

Related U.S. Application Data

[63] Continuation-in-part of Ser. No. 287,495, Dec. 21, 1988, Pat. No. 5,021,229.

[51] Int. Cl.$^5$ .................. B01D 53/14; B01D 53/34
[52] U.S. Cl. ........................ 423/240 R; 423/240 S; 423/245.1; 423/245.2; 110/345; 110/346; 588/207
[58] Field of Search ............ 423/DIG. 20, 240 R, 423/240 S, 245.1, 245.2, 245.3, DIG. 18; 110/345, 346; 588/207

[56] References Cited

U.S. PATENT DOCUMENTS

| | | | |
|---|---|---|---|
| 3,888,193 | 6/1975 | Kishigama et al. | 110/8 R |
| 4,201,751 | 5/1980 | Holter et al. | 423/245.1 |
| 4,243,635 | 1/1981 | Aberli | 422/171 |
| 4,303,477 | 12/1981 | Schmidt et al. | 201/25 |
| 4,502,396 | 3/1987 | Teller | 423/240 |
| 4,654,203 | 3/1987 | Maurer et al. | 423/245.3 |
| 4,681,045 | 7/1987 | Dvirka et al. | 423/232 |
| 4,681,845 | 7/1987 | Dvirka et al. | 110/345 |
| 4,753,181 | 6/1988 | Sosnowski | 110/346 |
| 4,781,532 | 12/1982 | Jons et al. | 423/240 |
| 4,793,270 | 12/1988 | Karasek et al. | 110/344 |
| 4,844,875 | 7/1980 | Ettenhadieh | 423/245.1 |
| 5,000,762 | 3/1991 | Lindquist et al. | 55/71 |
| 5,021,229 | 6/1991 | Gullett | 423/245.3 |

FOREIGN PATENT DOCUMENTS

| | | | |
|---|---|---|---|
| 3327961 | 2/1985 | Fed. Rep. of Germany | 423/244 A |
| 3527615 | 2/1987 | Fed. Rep. of Germany | . |
| 03615027 | 11/1987 | Fed. Rep. of Germany | 423/245.3 |
| 3623015 | 1/1988 | Fed. Rep. of Germany | 423/240 |
| 00041565 | 4/1979 | Japan | 110/345 |
| 0045978 | 4/1979 | Japan | 110/345 |
| 00052873 | 4/1979 | Japan | 110/345 |
| 62-61623 | 3/1987 | Japan | 423/240 |

OTHER PUBLICATIONS

"CRC Handbook of Chemistry and Physics", 54th Ed. R. C. Weast, ed. CRC Press: Cleveland (1973), p. B-77.
English language translation of DE-3,527,615.
Kohl, A. L.; Riesenfeld, F. C. "Gas Purification", 3rd Ed. Houston: Gulf Publication Co (1979), p. 360.
Klicius, R., et al. "Canada's National Incinerator Testing and Evaluation Program (NITEP) Air Pollution Control Technology Assessment," in Waste Management and Research (1987), vol. 5, pp. 301–310.
Yamamoto, T.; Inoue, S. "Post Furnace Formation of PCDD's and PCDF's in MSWI: Observations in an Incinerator Installed with Quench Reactor", in Chemosphere, vol. 20, #10–12, pp. 1915–1920 (1990).
Hay, D. J., et al. "The National Incinerator Testing and Evaluation Program", in Proc. Ontario Ind. Waste Conf., (33rd, 1986), pp. 71–85.

Primary Examiner—Gary P. Straub
Assistant Examiner—Peter T. DiMauro
Attorney, Agent, or Firm—Irving M. Freedman

[57] ABSTRACT

A method of diminishing the amount of chlorinated organics released to the atmosphere in the incineration of wastes which includes injecting calcium-based sorbents into the flue gas to react with HCl to form calcium-chlorine compounds to remove the HCl from the flue gas and prevent it from forming the chlorinated organics. The flue gas carries the sorbent from the injection zone to the reactive temperature zone quickly enough such that the sorbent is not exposed to temperatures which would degrade the effectiveness of the sorbent, the reactive temperature zone being in the range of 300° C. to 900° C.

13 Claims, 3 Drawing Sheets

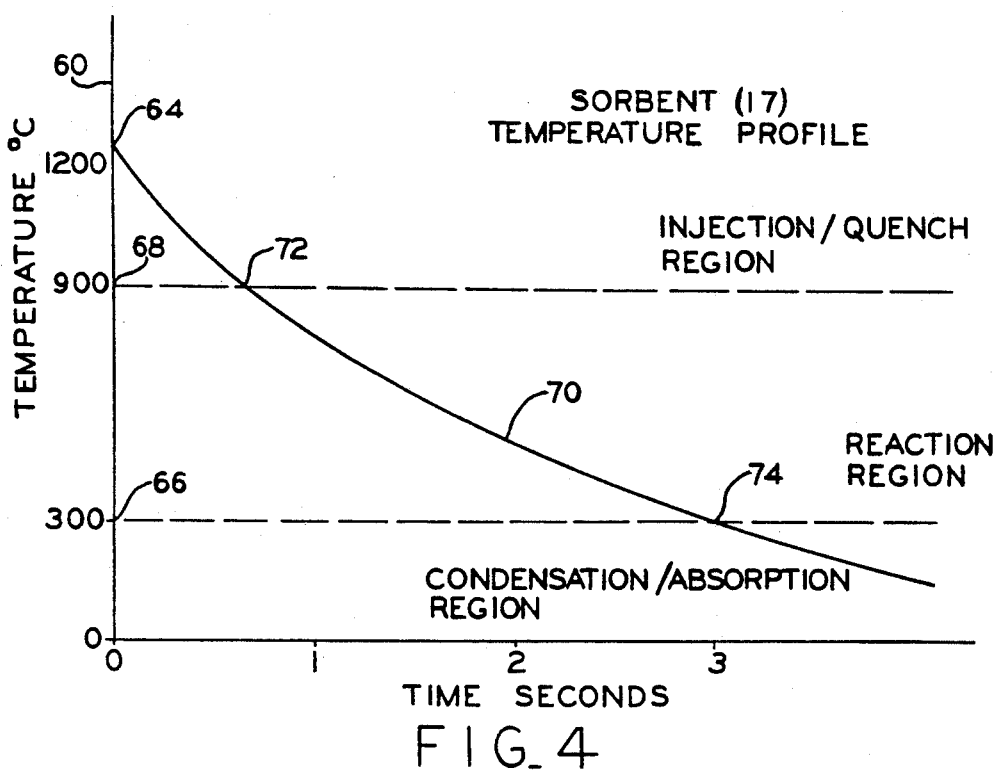
FIG_4
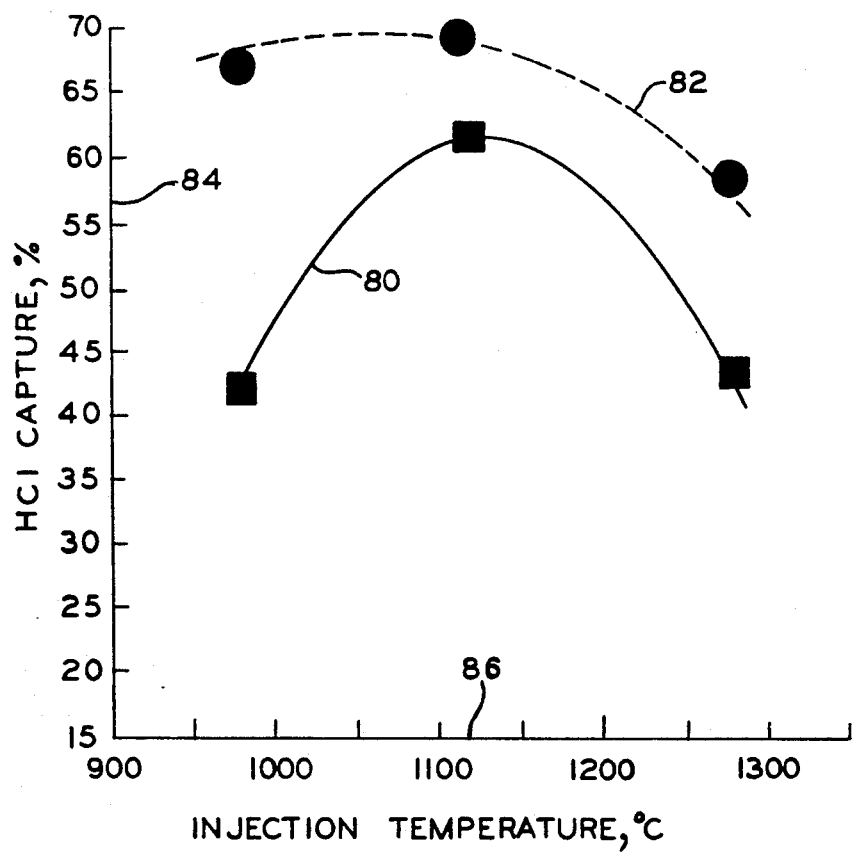
FIG_5

REDUCTION OF CHLORINATED ORGANICS IN THE INCINERATION OF WASTES

CROSS REVERENCE TO RELATED APPLICATION

The present invention is a continuation-in-part based on U.S. patent application Ser. No. 07/287,495 filed by the inventor hereof on Dec. 21, 1988, now U.S. Pat. No. 5,021,229, the benefit of which filing date is hereby claimed for the common subject matter contained therein.

BACKGROUND OF THE INVENTION

Considerable attention in recent years has been directed at the problem of the formation and emission into the atmosphere of highly toxic chlorinated organics by municipal and industrial waste incinerator plants. One of the major impediments to increased construction of such plants for the incineration of municipal and industrial waste has been the concern over the formation of such toxic chlorinated organics, namely polychlorinated dibenzodioxin (dioxins) and polychlorinated dibenzofuran (furans). It is desirable to prevent the formation of toxic chlorinated organics, which will 1) eliminate toxic air emissions, 2) eliminate disposal of toxic ashes, and 3) minimize the need for wet or dry scrubbers, which are presently used to remove acid gases and chlorinated organics from flue gas emissions.

Control of combustion factors such as temperature, overfire/underfire air ratio, carbon monoxide (CO), oxygen, and waste feed moisture, all of which have been shown to be related to the formation of dioxins and furans, can minimize the formation of these chlorinated organics. However, complete or effective elimination by this method appears impossible due to the complexities involved in monitoring and regulating the combustion of municipal and industrial waste. While it is generally agreed that control of combustion can minimize the emission of large amounts of toxic organics, complete or adequate control and destruction of dioxins and furans in waste incinerators cannot be ensured by these means alone. Indeed, there appears to be some dispute regarding the effectiveness of combustion controls, such as high furnace temperature, on the destruction of organics and the reduction of dioxins and furans.

Other methods of controlling toxic organics include sorting and removing chlorine-containing wastes, such as polyvinyl chloride (PVC) plastics, prior to waste combustion. Since chlorine-containing plastics account for only about 50% of the chlorine content of municipal solid waste (MSW), even complete removal and separate disposal (such as by burying in a landfill) of chlorine-containing materials will not sufficiently eliminate the problem. Indeed, this method appears to have only an erratic correlation with the reduction of toxic organics.

Spray drying by flue gas injection of a sorbent slurry is another method of toxic organics reduction. Toxic organics and their precursors tend to condense and become absorbed on the dried sorbent particles. The sorbent and flue gas particles are then removed by a baghouse or an electrostatic precipitator, reducing the toxic organic gas emissions. However, the collected particles will contain organic (e.g. dioxin/furan) levels that may be of considerable concern to subsequent solid waste disposal. Further, the procedure may promote the formation of dioxin/furan. As the sorbent/ash particles are trapped on the surfaces of the particulate collection device, their residence time in the system increases. This increases the amount of time that the condensed dioxin/furan precursors remain at temperatures which may be optimal for such formation.

Other methods have been suggested to prevent or minimize the formation of toxic emissions, as contrasted with emission removal after formation. These include, for example, U.S. Pat. No. 4,681,045—Dvirka et al. directed at injecting sodium carbonate ($Na_2CO_3$) or sodium bicarbonate ($NaHCO_3$) into the furnace to react with chlorides to form sodium chloride (NaCl) for reducing acid gas emissions such as hydrogen chloride (HCl) and sulfur dioxide ($SO_2$); thereby preventing downstream formation of dioxin/furan. However, this patent teaches against the use of calcium compounds such as calcium oxide (CaO) for such acid gas removal purposes. CaO is suggested in U.S. Pat. No. 2,800,172 for addition to petroleum fuel oil being burned to limit slag formation. However, these patents neither teach the process claimed herein nor achieve the desired objective of the present invention.

OBJECTS AND SUMMARY OF THE INVENTION

It is an object of the present invention to provide an improved method to reduce or prevent the formation of highly toxic dioxins and furans in waste incinerators by removing HCl, a reaction precursor.

It is a further object of the present invention to promote the proper disposal of wastes through incineration without creating health hazards or transferring pollutants between gas and solid media.

It is a still further object of the present invention to provide an improved method to reduce or prevent the formation of highly toxic dioxins and furans which can be readily applied to existing and new waste incinerators.

It is a still further object to provide a method for new incinerators that eliminates dioxins/furans without resorting to high operating temperatures for complete destruction of organics and subsequent high levels of nitrogen oxide ($NO_x$) formation.

In carrying out the above and other objects of the present invention, there is provided in a waste incinerator an improved method of reducing the emissions of chlorinated organics such as dioxins and furans produced by the combustion of waste material in which a calcium based sorbent material, such as calcium oxide CaO, calcium hydroxide [$Ca(OH)_2$], or calcium carbonate ($CaCO_3$), is injected into the furnace flue gas for reaction in sufficient time with the flue gas that the sorbent will react with the HCl in the flue gas to form calcium-chlorine compounds to diminish the amounts of chlorinated organics formed in the flue gases and subsequently released into the atmosphere. The flue gas carrying the sorbent is passed from the injection region through a temperature quench regime to the reactive region which is at a lower temperature than the sorbent injection region, and below that which would significantly damage the effectiveness of the sorbent. More particularly, the sorbent may be injected dry, or in a slurry, and the temperature of the reactive region is approximately 300° C. to 900° C.

DESCRIPTION OF THE DRAWINGS

The novel features which are believed to be characteristic of the present invention are set forth with particularity in the appended claims. The invention itself, both as to its organization and method of operation, together with further objects and advantages thereof, may be best understood by reference to the following description taken in conjunction with the accompanying drawings wherein:

FIG. 4 is a temperature profile showing the temperature variations to which the sorbent is exposed and illustrating the initial quenching action.

FIG. 5 is a plot showing the capture or removal of HCl with time for $CaCO_3$ and $Ca(OH)_2$ sorbents and illustrating the quenching action of FIG. 4.

Figure 1:
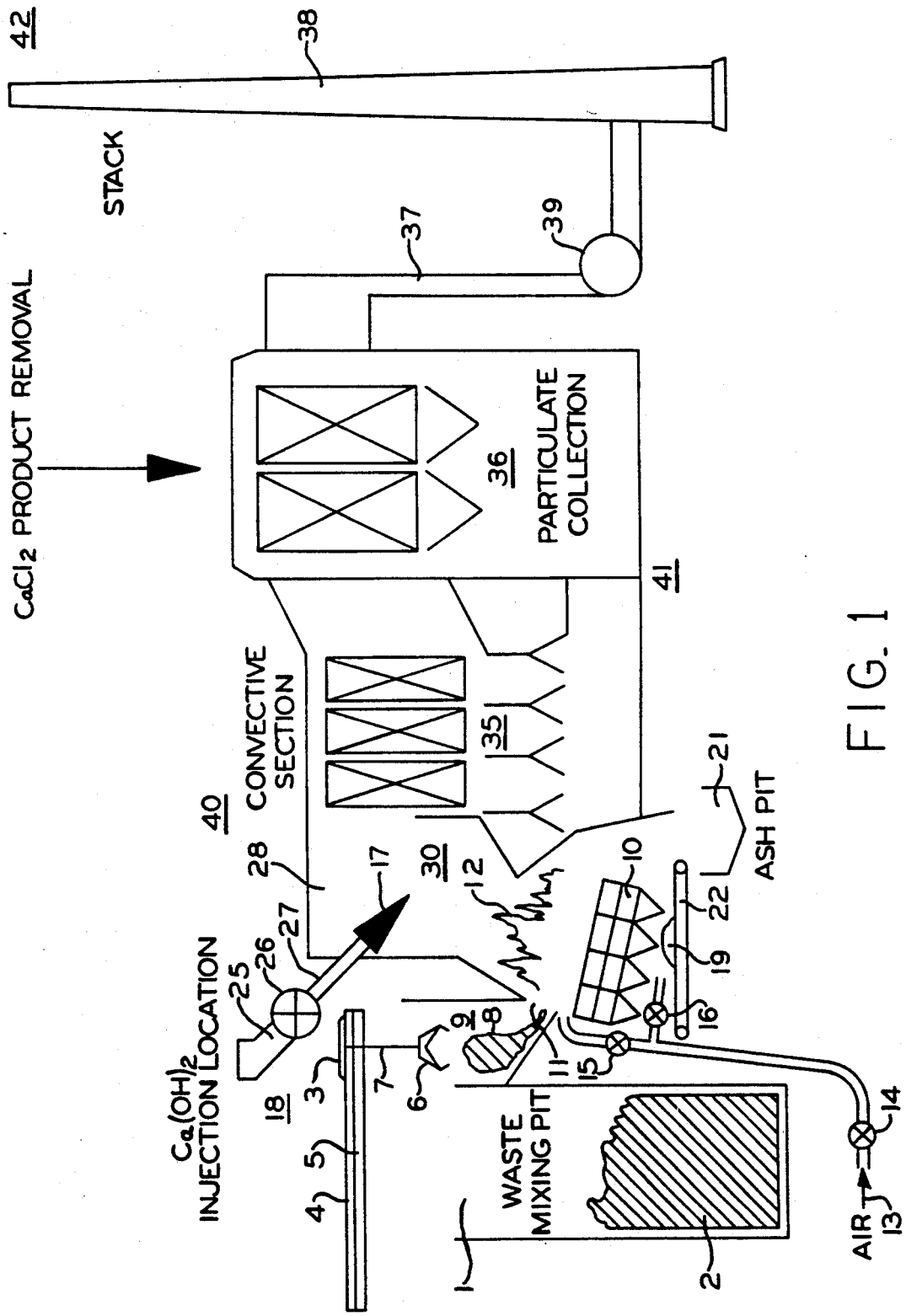
FIG. 1 is a diagram of a typical waste incineration system utilizing the present invention.

Referring first to FIG. 1, there is shown waste mixing pit 1 into which waste is dumped by suitable means such as overhead crane 3 moving along rails 4 and 5. Claw 6 of crane 3 is also moveable in a vertical direction through the control of the length of controllable or moveable cable 7. Crane 3 is used to load waste into mixing pit 2 and then to selectively load portions of waste 8 into chamber 9 where it is fed in a controlled manner through opening 11 onto stoker grate 10 which supports combustion or fire 12 in a manner well known in the art, including the control of air both above and below fire 12 in order to control the temperature of the combustion within the desired limits. The flow of air 13 is controlled by control valves 14, 15, and 16. Ashes 19 which result from combustion 12 fall through stoker grate 10 and are transported by conveyor belt 22 to ash pit 21 where they are removed for suitable disposal.

A calcium-based sorbent 17, such as CaO, or $Ca(OH)_2$, is dispensed from dispenser 18, which includes container 25, dispensing control 26, and nozzle 27 to be dry injected into the furnace flue gases, such as for example, into combustion chamber 30 above fire 12. The temperature of combustion chamber 30 in lo the region where sorbent is injected may be controlled by the furnace temperature control system including the control of air flow 13 through control valves 14, 15, and 16. An optimum reaction temperature for the present invention is around 700° C. The CaO or $Ca(OH)_2$ sorbent 17 reacts with HCl to form calcium-chlorine compounds such as solid $CaCl_2$ particles which flow through convective section 35 of the furnace, shown generally as 40, to the particulate collection section or collector 36 where suitable collectors such as electrostatic precipitators or baghouses remove the particles from the gases prior to their release into the atmosphere through piping 37 and stack 38. The removal of HCl by formation of calcium-chlorine compounds such as $CaCl_2$ particles will significantly decrease the amount of dioxins and furans which otherwise would be formed in the cooler end region or cooler portion (35, 36, and 37) shown generally as 41 of furnace 40. As a result, the release of dioxins and furans into atmosphere 42 outside the top of stack 38 is reduced, if not eliminated.

The particles of calcium-chlorine compounds such as $CaCl_2$ removed by collector 36, unlike the toxic dioxins and furans, are a harmless byproduct which can be disposed of conveniently with the ash.

The flue gas cools as it moves from the furnace combustion chamber through convective section 35 of furnace 40. While the chemical reaction of the sorbent and HCl decreases slightly as the flue gas cools, there is further removal of residual chlorinated organics through condensation and absorption on the sorbent surface at the lower flue gas temperatures. The velocity of the flue gas flow through the furnace can be controlled in the usual manner, such as with blower 39.

Figure 2:
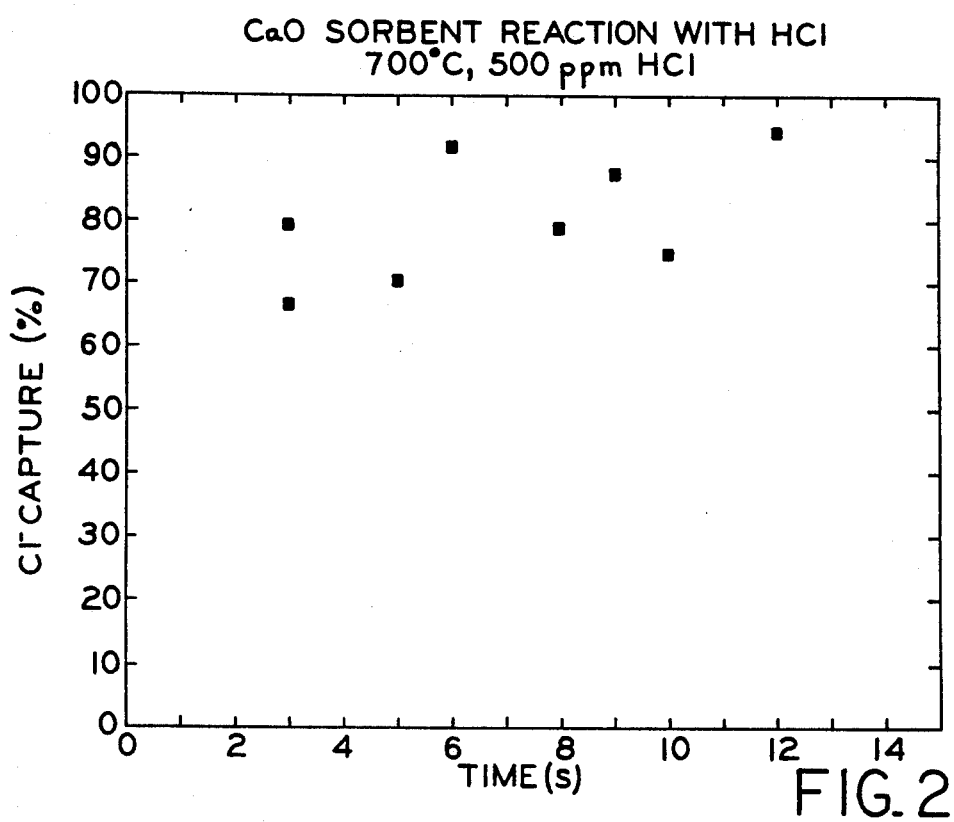
FIG. 2 is a plot showing the capture or removal of HCl with time for CaO sorbent in accordance with the present invention.
Figure 3:
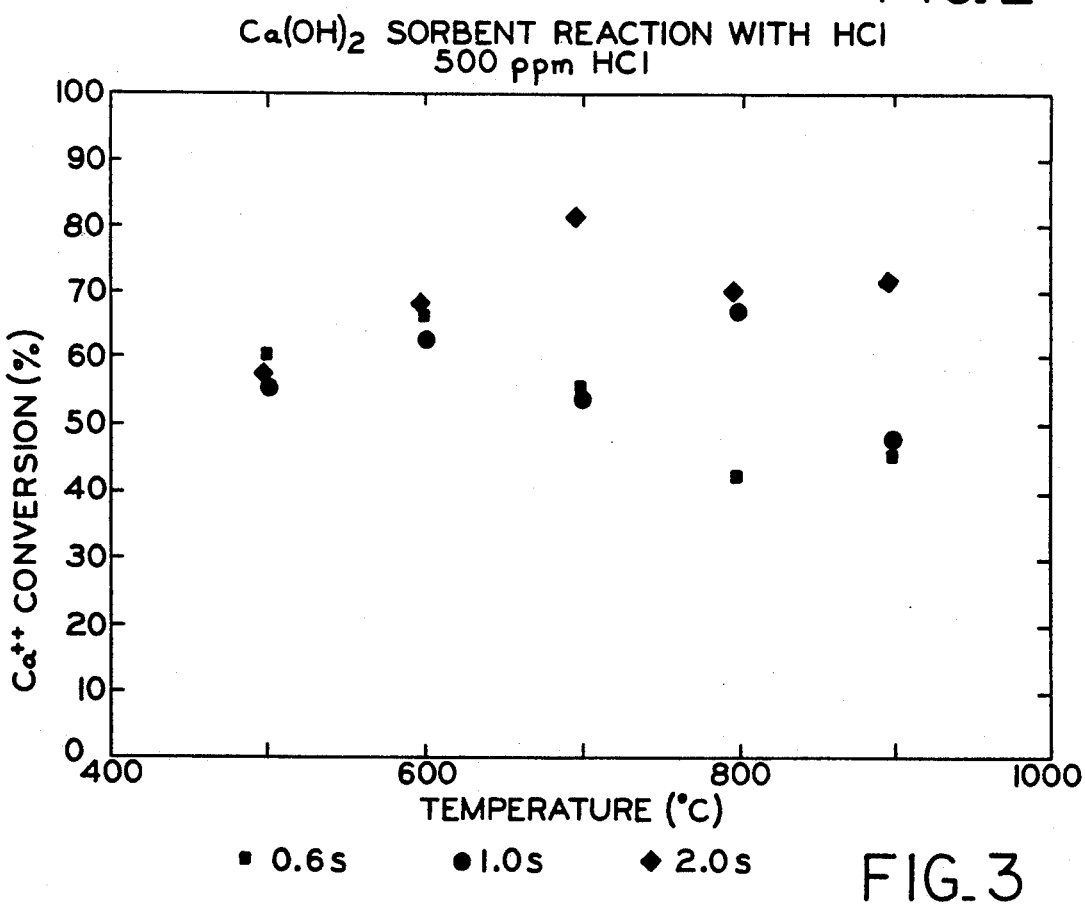
FIG. 3 is a plot showing the conversion of HCl with temperature for $Ca(OH)_2$ sorbent in accordance with the present invention.

FIG. 2 and FIG. 3 show laboratory scale test results comparing the chlorine (Cl) capture of CaO and $Ca(OH)_2$, respectively, in a number of tests. Tests in FIG. 2 were conducted in an isothermal, fixed bed reactor which was differential with respect to reactant HCl concentration. FIG. 2 illustrates the percent capture of Cl on the Y axis with time in seconds on the X axis, it being recognized that both the amount of capture and the speed of capture are important in the operation of commercial incinerators. In the tests illustrated by FIG. 2, the temperature was controlled to 700° C. and there were 500 parts per million of HCl (a typical value for waste incinerators) introduced into the test chamber. It is to be noted that there was in excess of 60% capture of the HCl in 3 seconds and that the amount of capture was well in excess of 90% in 12 seconds. Cl capture refers to the calculated removal of Cl at an injected Ca/Cl ratio of 1/1, with the product formed being one or more calcium-chlorine compounds such as $CaCl_2$.

FIG. 3 shows testing at shorter times with $Ca(OH)_2$ in place of the CaO. As shown on the X axis, the temperature was varied from 500° to 900° C. These tests were conducted in an isothermal, entrained-flow reactor. The Y axis shows the percentage conversion of the $Ca^{++}$ to a calcium-chlorine compound such as $CaCl_2$. The HCl was 500 parts per million and the sorbent and HCl reacted effectively over a wide range of temperatures (900° to 500° C.) with the optimum temperature being around 700° C. Temperatures in the order of as low as 300° C. can also provide effective removal of HCl from the flue gas. Conversion values are the molar percentage of $Ca(OH)_2$ that reacts to form $CaCl_2$ and as shown by FIG. 3 are very high.

FIG. 3 shows that the HCl removal by $Ca(OH)_2$ injection is (1) very effective, and (2) effective over a wide temperature range. This is important since the temperature within municipal and industrial waste incinerators is difficult to control precisely. The broad temperature range of sorbent reactivity ensures that sorbent in a quench environment traverses a large range of reactive temperatures leading to long residence times and hence effective HCl removal.

It is thus apparent that calcium based sorbents such as CaO and $Ca(OH)_2$ are highly effective in HCl removal. Other calcium based sorbents which could be used are calcium carbonate ($CaCO_3$), dolomitic sorbents ($CaCO_3$- $MgCO_3$), calcium-silicate sorbents, and recycled sorbents ($CaO$-$CaCl_2$ or $CaO$-$CaSO_4$).

That is, the flue gas cools as it flows sequentially through the furnace or waste incinerator 40, from the furnace combustion chamber 30 through convective section 35, through collector 36 toward stack 38 into the atmosphere 42. The calcium based sorbent injected into the flue gas is carried along through those various regions of the furnace, and encounters progressively lower or quenched temperatures as it moves toward stack 38. As a result, the sorbent may be injected into the flue gases with temperatures above the melting point of calcium chloride (782° C.). For example, calcium based sorbents such as calcium hydroxide can be injected into such a quench environment at temperatures in excess in 1200° C., without significantly degrading the effectiveness of the sorbent. The flue gas temperature to which the sorbent is exposed decreases rapidly as the sorbent is carried in the flue gas toward the stack to temperatures lower than that which would melt the calcium chloride and sinter or significantly deactivate the sorbent. The initial higher temperature exposure assists in converting the sorbent, such as, for example, calcium hydroxide, to the more active calcium oxide. Such a temperature profile allows the sorbent to reach its more reactive form prior to reaching the optimal temperature region for reaction with HCl, increasing the residence time of the calcium oxide in passing through the reactive zone of the furnace. Thus, the calcium oxide is exposed for a longer time period to react with the HCl, as the flue gas and calcium oxide move downstream toward the stack through a temperature zone which decreases from over 1000° C. to 300° C. or less. The initial temperature quench region and the subsequent reactive temperature region thus avoids the melting of the calcium chloride and also enables longer and more effective reaction with HCl to form $CaCl_2$ and/or the calcium-chlorine compounds such as calcium chloride hydroxides and calcium chloride hydrates. This removes HCl from the flue gas, and also removes HCl from the emissions into the atmosphere, in addition to removing furans and dioxins. The non-toxic calcium-chlorine compounds may then be removed by particle collector 36. The sorbent does not remain at the elevated temperatures for a long enough time which could degrade the effectiveness of the sorbent, such as by melting or sintering. Melted calcium chloride, for example, could stick to the furnace walls.

Alternatively, the sorbent 17, instead of being dry, may be injected or dispensed from dispenser 18 in a slurry to assist in the dispersion of the sorbent. The slurry can be injected into high temperature regions of the flue gas, temperatures in excess of 1200° C. since the initial higher temperature provides added energy to evaporate the water carrier. By the time the sorbent 17 is freed from the water and its activated form is more fully exposed to the flue gases, the quench action of passing through the furnace 40 toward stack 38 exposes the sorbent to temperatures below that which would melt the sorbent, or otherwise degrade the effectiveness of the calcium oxide. Even temperatures below 300° C. still provide reaction with HCl in the flue gas to form calcium-chlorine compounds such as $CaCl_2$ and thereby remove HCl from the flue gas.

FIG. 4 illustrates an example of the sorbent 17 temperature profile useful in understanding the present invention. Referring to FIG. 4, the plot or profile is plotted with temperature in degrees centigrade on the Y axis 60 and time in seconds on the X axis 62. The sorbent temperature profile 70 is the temperature in the flue gas to which the sorbent 17 is exposed as it passes through the furnace 40 from the combustion chamber 30 to the stack 38. As shown by FIG. 4, the sorbent 17 is injected into the combustion chamber 30 at a temperature in excess of 1200° C. into the injection/quench zone 64, 68 which is in excess of approximately 900° C. and moves relatively quickly through the quench zone into a flue gas zone which is in the range of approximately 300° C. to 900° C., which is indicated as the reactive zone 66, 68. As shown in FIG. 4, the reactive zone is the region between temperatures 66 and 68 or the temperature region between 300° C. and 900° C. It is to be noted that the injection/quench region that the sorbent passes through, which is from the injection temperature 64 until, at 72 it reaches 900° C., is of relatively short duration compared to the residence period that the sorbent experiences in passing from 72 to 74, the reactive region in which the temperature decreases from 900° to 300° C. as the sorbent 17 passes through the furnace 40 toward the stack 38. It is during the passage of the sorbent 17 through the reactive region 72, 74 that the sorbent reacts with the HCl in the waste to form calcium-chlorine compounds as discussed above. Also, as discussed above, there is further removal of the residual chlorinated organics in the condensation/absorption region through the condensation and absorption on the sorbent surface at the lower flue gas temperatures below the temperature 66. That is, in the flue gas temperature region below 300° C. the sorbent continues to remove residual chlorinated organics.

It is to be appreciated that the temperature profile of a specific waste incinerator will depend on the design of the waste incinerator furnace and associated operating characteristics such as the rate of flow of the flue gases through the furnace 40 and the operation of the furnace including, for example, the control of the air flow both above and below the fire 12 and the flow of the air 13. As a result, the sorbent 17 is injected at a location which will ensure that the temperature to which the sorbent is exposed in passing through the injection region 64, 72 to the reactive region 72, 74 is maintained sufficiently of short duration that the temperature of the injection region does not significantly degrade the effectiveness of the sorbent 17 in forming calcium-chlorine compounds in order to remove HCl from the emissions into atmosphere 42 from stack 38. However, it is to be further noted that effectiveness of the present invention does not require injection at a specific or critical temperature, or a specific or critical location in the furnace, which greatly facilitates the addition by way of retrofitting of the present invention to existing waste incinerators. This is illustrated, in part, through the plots shown in FIG. 5.

Referring to FIG. 5, it is to be noted that the percent of HCl capture is plotted on the Y axis 84 while the injection/quench temperature is plotted on the X axis 86 in degrees centigrade. The plot 80 indicates the effect of the injection temperature on $CaCO_3$ over a relatively wide temperature range of approximately 950° C. to 1250° C., while the plot 82 indicates the effect of the injection temperature on $Ca(OH)_2$ over the same temperature range. A comparison of the two plots suggests that while the $Ca(OH)_2$ was more effective in HCl capture, the injection temperature may be less critical in the case of $Ca(OH)_2$ than that for $CaCO_3$. However, the exact location of the sorbent injection is not critical for effective operation of the present invention.

In the actual tests involving injection into the combustion chamber as shown by FIG. 5, $CaCO_3$ and $Ca(OH)_2$ were injected into flue gas temperatures which varied from approximately 950° C. to 1275° C., that is above the temperature of the reactive region 72, 74. The HCl capture varied from around 40% at the extremes of the range for $CaCO_3$ with a maximum in excess of 60% at around 1125° C. The HCl capture for $Ca(OH)_2$ varied in a range of approximately 60% to 70% with the maximum being approximately 70% at around 1125° C. This suggests that for a particular furnace 40 exhibiting a generally inherent temperature quench gradient or change in temperature as the flue gas and sorbent are carried to the stack 38, that an optimum injection temperature region may exist for a given furnace design with substantially fixed transit time for the sorbent. It is believed that the optimum sorbent dispenser 18 location, which can be determined by experimentation for a given waste incinerator furnace design, will vary somewhat between different furnaces and furnace designs depending on the flue gas and sorbent transit time. However, it is important to note that the subject invention is very effective over a relatively wide temperature range enabling the location of the sorbent dispenser 18 at a convenient yet non-critical location, facilitating the retrofitting of existing waste incinerators.

Accordingly, it is possible to obtain increased transit and reactive time and further control the effectiveness of the sorbent 17 in passing through the furnace 40, by injecting the sorbent in, or close to the combustion chamber 30, that is, in the higher temperature regions of the waste incinerator. The broad temperature range over which the calcium based sorbent 17 may be injected is of distinct advantage in retrofitting existing waste incinerator systems since the furnace 40 construction, and the design of a particular existing furnace, may not readily lend itself to the addition of sorbent dispenser 18 at a specific point or temperature region. With the subject invention, the sorbent dispenser 18 can be physically inserted through the furnace 40 at a convenient location in a range of locations which provides adequate and effective temperature and reactive time. This facilitates and enables the physical addition of the dispenser. Thus, the present invention is effective in the reduction of emission of halogenated pollutants and in particular dioxins and furans, but also other pollutants such as HCl.

While the invention has been described in a specific embodiment, it will be understood that modifications may be made by those skilled in the art, including the application of the invention to different types of burner systems and wastes, and it is intended by the appended claims to cover all such modifications and changes as fall within the true spirit and scope of the invention.

I claim:

1. In a method for treating the flue gas in a waste incinerator to reduce the emission into the atmosphere of halogenated pollutants including chlorinated dioxins and furans produced by the waste combustion process, and in which the water incinerator includes a combustion chamber and a stack toward which, and through which, the flue gas produced by the combustion of waste material in the combustion chamber passes for emission into the atmosphere and in which the flue gas sequentially passes through an injection region in said combustion chamber, a reactive region within said waste incinerator, and a condensation/absorption region providing a decreasing temperature profile as the flue gas proceeds through the waste incinerator the improvement comprising the steps of:

positioning a sorbent dispenser for injection of a sorbent from outside said waste incinerator into said injection region within said combustion chamber of said waste incinerator at a location where the temperature of said injection region is substantially higher than the temperature of said reactive region;

injecting a calcium-based sorbent through said sorbent dispenser into said flue gas to be carried with said flue gas from the injection region through said decreasing temperature profile toward said stack;

heating said sorbent in said injection region in said combustion chamber at a temperature higher than that in said reactive region during the passage of said sorbent from sorbent dispenser to said reactive region;

wherein said sorbent is activated during the transit time of said sorbent through said injection region to improve the reaction of said sorbent with flue gas in said reactive region, while at the same time passing through said temperature profile to the lower temperatures of said reactive region;

said positioning of said sorbent dispenser being selected such that the temperature of said injection region is in the order of 900° C. to 1200° C. and the transit time during which said sorbent passes through said injection region is controlled to prevent significant damage to the effectiveness of said sorbent;

said sorbent chemically reacting in said reactive region with HCl in said flue gas at temperatures beginning at approximately 900° C. and significantly below the injection temperature of said injection region to form one or more calcium-chlorine compounds thereby modifying said flue gas by removing HCl from said flue gas;

passing the modified flue gas toward said stack with diminished HCl;

reducing the temperature to condense and absorb residual chlorinated organic pollutants on said sorbent after said sorbent passes through said reactive region and passes toward said stack at a temperature less than about 300° C. in said modified flue gas; separating said sorbent from said modified flue gas through use of a particle collector; and releasing resulting gas into the atmosphere;

whereby substantially the entire waste incinerator is used to maximize the contact time of said sorbent with said flue gas.

2. The method of reducing the emission of pollutants of claim 1 wherein said sorbent is selected from the group consisting of CaO, Ca(OH)$_2$, CaCO$_3$, CaCO$_3$-MgCO$_3$, CaO-CaCl$_2$, and calcium silicates.

3. The method of reducing the emission of pollutants of claim 2 wherein said injection is dry injection.

4. The method of reducing the emission of pollutants of claim 1 wherein said injection is a slurry including said sorbent, and a portion of the liquid of said slurry evaporates in said injection region before said sorbent reaches said reactive region.

5. The method of reducing the emission of pollutants of claim 2 wherein said sorbent is included in a slurry, and further comprising the step of evaporating a portion of the liquid of said slurry in said injection region before said sorbent is carried into said reactive region in said flue gas in order to activate said sorbent prior to reaching said reactive region.

6. The method of reducing the emission of pollutants of claim 1 wherein the temperatures of said injection region to which said sorbent is exposed activates said sorbent by converting said sorbent to a different form for more effective reaction in said reactive region of said waste incinerator.

7. A method of retrofitting and operating an existing waste incinerator to reduce the emission into the atmosphere of halogenated pollutants including chlorinated dioxins and furans produced by the waste combustion process, and in which the waste incinerator includes a combustion chamber and a stack through which the flue gas produced by the combustion of waste material in the combustion chamber passes for emission into the atmosphere, and used for incinerating waste such as municipal waste of variable composition including chlorine containing wastes in which the temperature profile of the flue gas decreases as it transits the waster incinerator from said combustion chamber through a reactive region to the stack comprising the steps of:

affixing a sorbent dispenser extending from the exterior to the interior of said waste incinerator at a location for injecting a calcium-based sorbent into said flue gas in an injection region having a temperature in the approximate range of 900° C.-1200° C. such that said sorbent when injected through said sorbent dispenser is carried with said flue gas from the injection region toward said stack;

said flue gas and said sorbent passing through said injection region for heating and activation of said sorbent during the period of time said sorbent passes through said injection region;

said sorbent then being carried in said flue gas through a reactive region which spans a waster furnace temperature range of approximately 300° C.-900° C. ion said waste incinerator providing a residence period in said reactive region during which the activated sorbent reacts with HCl in said flue gas to form one or more calcium-chlorine compounds thereby to modify said flue gas by removing HCl from said flue gas; and reducing the temperature to condense and absorb residual chlorinated organic pollutants on said sorbent after said sorbent passes through said reactive region toward said stack at a temperature less than about 300° C. in said modified flue gas;

passing the modified flue gas to the stack of said waste incinerator and into said atmosphere with diminished HCl thereby diminishing the amount of said chlorinated dioxins and furans which would otherwise have been formed;

said location for affixing said sorbent dispenser and for injecting said sorbent being selectively determined such that said period of time and movement of said sorbent through said injection region to said reactive region is controlled such that the temperature to which said sorbent is exposed in passing through said injection region enhances the effectiveness of said sorbent yet does not melt the compounds of the reaction.

8. The method of reducing the emission of pollutants of claim 7 wherein said sorbent is selected from the group consisting of CaO, Ca(OH)$_2$, CaCO$_3$, CaCO$_3$-MgCO$_3$, CaO-CaCl$_2$, and calcium silicates.

9. The method of reducing the emission of pollutants of claim 7 wherein said sorbent is included in a slurry, and further comprising the step of evaporating a portion of the liquid of said slurry in said injection region before said sorbent is carried into said reactive region in said flue gas in order to activate said sorbent prior to reaching said reactive region.

10. For use In a waste incinerator including a combustion chamber and a stack through which the flue gas produced by the combustion of waste material in the combustion chamber passes for emission into the atmosphere, an improved method of reducing the emissions into the atmosphere of halogenated pollutants of flue gases, including the reduction of chlorinated dioxins and furans produced as by-products of the combustion of water material such as municipal waste, comprising the steps of:

injecting a calcium-based sorbent into said flue gas in said waste incinerator to be carried with said flue gas from the injection region toward said stack and through decreasing temperatures of the temperature profile of said wasted incinerator;

said flue gas and said sorbent sequentially passing through the hither temperatures of said injection region and then through the lower temperature of a reactive region in said waste incinerator;

said sorbent reacting in said reactive region with HCl in said flue gas to form one or more calcium-chlorine compounds thereby modifying said flue gas by removing HCl from said flue gas;

the location of the injection of said sorbent in the temperature profile of said waste incinerator being selected such that the movement of said sorbent through said injection region is sufficiently rapid that said sorbent does not melt and the effectiveness of said sorbent is not significantly degraded notwithstanding any temperature in said injection region being above the melting point of said compounds;

the temperature of said reactive region being in the approximate range of 300° C.-900° C.; and passing said modified flue gas toward said stack and into said atmosphere with diminished HCl thereby diminishing the amount of said halogenated pollutants which would otherwise have been formed;

reducing the temperature to condense and absorb residual chlorinated organic pollutants on said sorbent after said sorbent passes through said reactive region toward said stack at a temperature less than about 300° C. in said modified flue gas;

whereby said sorbent is exposed to said flue gas over substantially the full length of said waste incinerator to maximize the contact time of said sorbent and said flue gas to aid in the effectiveness of said method.

11. The method of reducing the emission of pollutants of claim 10 wherein said sorbent is selected from the group consisting of CaO, Ca(OH)$_2$, CaCO$_3$, CaCO$_3$-MgCO$_3$, CaO-CaCl$_2$, and calcium silicates.

12. The method of reducing the emission of pollutants of claim 11 wherein said sorbent is included in a slurry, and further comprising the step of evaporating a portion of the liquid of said slurry in said injection region before said sorbent is carried into said reactive region in said flue gas for exposure to the temperature of said reactive region in order to activate said sorbent prior to reaching said reactive region.

13. The method of reducing the emission of pollutants of claim 11 wherein said injection is dry injection.

* * * * *